(12) United States Patent
Hu (10) Patent No.: US 10,825,635 B2
(45) Date of Patent: *Nov. 3, 2020

(54) ELECTRON EMITTER FOR AN X-RAY TUBE

(71) Applicant: Luxbright AB, Gothenburg (SE)

(72) Inventor: Qiu-Hong Hu, Gothenburg (SE)

(73) Assignee: Luxbright AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/117,861

(22) PCT Filed: Feb. 10, 2015

(86) PCT No.: PCT/EP2015/052789
§ 371 (c)(1),
(2) Date: Aug. 10, 2016

(87) PCT Pub. No.: WO2015/118178
PCT Pub. Date: Aug. 13, 2015

(65) Prior Publication Data
US 2016/0358740 A1  Dec. 8, 2016

Related U.S. Application Data (60) Provisional application No. 61/937,677, filed on Feb. 10, 2014.

(51) Int. Cl.
*H01J 35/06* (2006.01)
*G01N 23/046* (2018.01)
*G01V 5/00* (2006.01)

(52) U.S. Cl.
CPC ......... *H01J 35/065* (2013.01); *G01N 23/046* (2013.01); *G01V 5/00* (2013.01);
(Continued)

(58) Field of Classification Search
CPC ........... A61B 6/00; A61B 6/40; A61B 6/4007; A61B 6/405; A61B 6/44; A61B 6/48;
(Continued)

(56) References Cited

U.S. PATENT DOCUMENTS 5,744,911 A * 4/1998 Kim ................... H01J 1/135
315/105
7,085,351 B2 * 8/2006 Lu ...................... A61B 6/4488
315/169.3

(Continued)

FOREIGN PATENT DOCUMENTS

DE 102007034222 A1 1/2009
DE 102013214096 A1 4/2014
(Continued)

OTHER PUBLICATIONS

Liu, Jianwei, et al., "Water-Assisted Growth of Aligned Carbon Nanotube-ZnO Heterojunction Arrays"; (2006), Wiley InterSAcience, Advanced Materials, vol. 18, pp. 1740-1744. (Year: 2006).*

(Continued)

*Primary Examiner* — Anastasia Midkiff
(74) *Attorney, Agent, or Firm* — Knobbe, Martens, Olson & Bear, LLP (57) ABSTRACT

Example embodiments presented herein are directed towards an electron emitter for an x-ray tube. The electron emitter comprises an electrically conductive substrate and a nanostructure material. The nanostructure material is comprised on at least a portion of the electrically conductive substrate. The nanostructure material is made of oxides, nitrides, silicides, selenides or tellurides. Such an electron emitter may be used for hybrid emission, such as Schottky emission or field emission.

10 Claims, 6 Drawing Sheets

(52) U.S. Cl.
CPC ............... *H01J 2201/30488* (2013.01); *H01J 2201/30496* (2013.01)

(58) Field of Classification Search
CPC . A61B 6/485; H05G 1/00; H05G 1/02; H05G 1/08; H05G 1/085; H05G 1/30; H05G 1/32; H05G 1/34; H05G 1/46; H05G 1/56; H05G 1/70; H01J 1/00; H01J 1/02; H01J 1/13; H01J 1/135; H01J 1/14; H01J 1/142; H01J 1/144; H01J 1/146; H01J 1/148; H01J 1/15; H01J 1/16; H01J 1/30; H01J 1/3048; H01J 1/312; H01J 1/46; H01J 1/88; H01J 1/90; H01J 1/94; H01J 29/00; H01J 29/006; H01J 29/02; H01J 29/025; H01J 29/04; H01J 19/00; H01J 19/02; H01J 19/04; H01J 19/06; H01J 19/062; H01J 19/064; H01J 19/066; H01J 19/068; H01J 19/08; H01J 19/42; H01J 19/44; H01J 19/48; H01J 19/78; H01J 35/00; H01J 35/02; H01J 35/025; H01J 35/04; H01J 35/045; H01J 35/06; H01J 35/065; H01J 35/08; H01J 35/14; H01J 2201/30496; H01J 2201/306; H01J 2201/312; H01J 2201/3125; H01J 2201/319; H01J 2235/00; H01J 2235/02; H01J 2235/06; H01J 2237/00; H01J 2237/02; H01J 2237/03; H01J 2237/032; H01J 2237/036; H01J 2237/038; H01J 2201/00; H01J 2201/19; H01J 2201/196; H01J 2201/28; H01J 2201/30; H01J 2201/304; H01J 2201/30446; H01J 2201/30449; H01J 2201/30453; H01J 2201/30469; H01J 2201/3048; H01J 2201/30403; H01J 2201/30426; H01J 2201/30434; H01J 2201/30484; H01J 2201/30488; H01J 2201/30492

See application file for complete search history.

(56) References Cited

U.S. PATENT DOCUMENTS

| | | | | |
|---|---|---|---|---|
| 7,850,941 B2* | 12/2010 | Tsakalakos | ............. | C30B 11/12 423/445 R |
| 2001/0019601 A1 | 9/2001 | Tkahashi et al. | | |
| 2002/0094064 A1 | 7/2002 | Zhou et al. | | |
| 2003/0036332 A1 | 2/2003 | Talin et al. | | |
| 2003/0080668 A1* | 5/2003 | Yamamoto | ............... | H01J 1/20 313/417 |
| 2004/0150311 A1 | 8/2004 | Jin | | |
| 2005/0269528 A1* | 12/2005 | Kruit | ...................... | B82Y 10/00 250/492.22 |
| 2006/0274889 A1 | 12/2006 | Lu et al. | | |
| 2009/0003529 A1 | 1/2009 | Zou et al. | | |
| 2010/0025673 A1* | 2/2010 | Hu | ......................... | H01L 33/06 257/43 |
| 2011/0018427 A1* | 1/2011 | Hu | ......................... | H01J 1/304 313/495 |
| 2011/0280371 A1 | 11/2011 | Molloi et al. | | |
| 2013/0200776 A1* | 8/2013 | Hu | ........................ | H01J 1/304 313/496 |
| 2014/0029728 A1 | 1/2014 | Kim et al. | | |
| 2014/0346976 A1* | 11/2014 | Hu | ........................ | H01J 1/3044 315/326 |

FOREIGN PATENT DOCUMENTS

| | | | | |
|---|---|---|---|---|
| EP | 0732720 A1 * | 9/1996 | ............. | H01J 1/304 |
| EP | 0905737 A1 | 3/1999 | | |
| GB | 2332089 A | 6/1999 | | |
| JP | 01-140099 A | 6/1989 | | |
| JP | 2001-250496 A | 9/2001 | | |
| JP | 2001-525590 A | 12/2001 | | |
| JP | 2002-238885 A | 8/2002 | | |
| JP | 2004-511884 A | 4/2004 | | |
| JP | 2005-516343 A | 6/2005 | | |
| JP | 2008-251341 A | 10/2008 | | |
| JP | 2009-009942 A | 1/2009 | | |
| JP | 2013-524452 A | 6/2013 | | |
| JP | 2014-502014 A | 1/2014 | | |
| RU | 2011143319 A | 5/2013 | | |
| TW | 200518155 A | 6/2005 | | |
| WO | 02/31857 A1 | 4/2002 | | |
| WO | 03/063195 A1 | 7/2003 | | |
| WO | 2011-124555 A1 | 10/2011 | | |

OTHER PUBLICATIONS

Banerjee, S.H. Jo, et al., "Field Emission of Zinc Oxide Nanowires Grown on Carbon Cloth", (Aug. 17, 2004), American Institute of Physics, Appl. Phys. Lett., vol. 85, No. 8, pp. 1407-1409. (Year: 2004).*
Heo, Y.W., et al. "ZnO Nanowire Growth and Devices", (Dec. 25, 2004), Materials Science and Engineering R, Elsevier Publishing, #47, pp. 1-20. (Year: 2004).*
Lee, C.J., et al., "Field Emission from Well-Aligned Zinc Oxide Nanowires Grown at Low Temperature", (Oct. 28, 2002), American Insitute of Physics, Appl. Phys. Lett., vol. 81, No. 19, pp. 3648-3650. (Year: 2002).*
Ozgur, U., et al. "A Comprehensive Review of ZnO Materials and Devices", (Aug. 30, 2005), American Institute of Physics, Journal of Applied Physics, #98, 041301, pp. 1-104. (Year: 2005).*
Chinese Office Action dated Sep. 25, 2017 in Application No. 2015800190206, title: An Electron Emitter for an X-Ray Tube (including translation).
First Office Action dated Oct. 9, 2017 in EP Application No. 15705247.3, in 2 pages.
Search Report for Russian Application No. 2016135638, dated Aug. 23, 2018 in 4 pages (English translation included).
Office Action for Russian Application No. 2016135638, dated Aug. 27, 2018 in 9 pages (English translation included).
Non-Final Office Action in Japanese Application No. 2016-568132 including English translation in 14 pages.
Japanese Office Action for Application No. 2016-568132, dated Jul. 12, 2019, in 9 pages (English translation provided).
Indian Office Action for Application No. 201617027151, dated Sep. 19, 2019 in 7 pages.
Final Office Action in Japanese Application No. 2016-568132 including English translation in 11 pages.
Liu et al., "Water-Assisted Growth of Aligned Carbon Nanotube-ZnO Heterojunction Arrays," Advanced Materials, (2006), 18: 1740-1744.

* cited by examiner

ELECTRON EMITTER FOR AN X-RAY TUBE

CROSS-REFERENCE TO RELATED APPLICATIONS

This application is the U.S. National Phase under 35. U.S.C. § 371 of International Application PCT/EP2015/052789, filed Feb. 10, 2015, which claims the benefit of U.S. Provisional Application No. 61/937,677, filed Feb. 10, 2004. The disclosures of the above-described applications are hereby incorporated by reference in their entirety.

TECHNICAL FIELD

Example embodiments presented herein are directed towards an electron emitter for an x-ray tube. The electron emitter comprises a nanostructure coating made of oxides, nitrides, silicides, selenides or tellurides. Example embodiments are further directed towards an x-ray tube.

BACKGROUND

The emission of electrons from the surface of a conductor is caused by heating the conductor to elevated temperatures, the thermionic emission; by shaping the conductor into a sharp point and applying a negative voltage, the field emission, or by applying a moderate heating to assist the field emission, for example, Schottky emission (as a matter of fact, there are more emission mechanisms as well, like photoemission and gas ion impact emission). An electron emitter is commonly referred to as a cathode. The cathodes working under the respective emission modes are called hot cathodes, cold cathodes or Schottky cathodes, respectively. A device that provides electron beams is called an electron source or electron gun. The electrons are perhaps the most common stimulus for secondary beams.

The x-rays are generated by the bombardment of energetic electrons on a metal surface. In this setting, an x-ray source is a device comprising 1) a cathode and 2) an electron receiver known as the target or anode. The anode is the x-ray emitter. The cathode and the anode are arranged in a particular configuration, and are enclosed in a vacuum housing. Moreover, an x-ray system may comprise the following components, 1) the x-ray source, 2) the computerized manipulation and handling device, 3) the detectors and 4) the power unit(s). In combination with other technologies, x-ray find applications in medical imaging, security inspection, and nondestructive testing in industry. Computer technology has revolutionized the use of x-ray in modern society, for example, x-ray CT scanner (computed tomography). The advancement in detector technology allowed improved energy resolution, digital images, and continuously increasing scan rates and areas. On the contrary, the technology on the electron source for generating x-rays remains essentially the same since the birth of the Coolidge tube for about 100 years ago, when William Coolidge revolutionized the way X-rays were generated by replacing the gas-filled tubes with an evacuated tube housing a hot tungsten filament to utilize thermionic emission.

SUMMARY

Perhaps all x-ray tubes used in x-ray imaging utilizes hot cathodes of tungsten filaments based on thermionic emission. In the past decade or so, attempts were made to use carbon nanotubes (CNTs) as cold cathodes to generate X-rays by means of field emission. Such electron emission is induced by a high electric field without heating. CNTs are thought of as an ideal emitter for electrons. However, to use them in x-ray sources, the manufacturing process and work conditions seem to present severe challenges to their material properties. The current output is still well below the level for practical applications. Thus, at least one object of the example embodiments presented herein is to provide an alternative electron emitter, which may provide for alternate means of electron emission to overcome the material and operational disadvantages inherent in the hot cathodes as well as in the cold cathode based on CNTs; and at the same time brings in improved performance of the x-ray sources.

Accordingly, the example embodiments presented herein are directed towards an electron emitter for x-ray devices. The electron emitter comprises a nanostructure material made of oxides, nitrides, silicides, selenides or tellurides. Such a nanostructure material makes the electron emitter suitable for field emission and more importantly for Schottky emission. The use of a thermally assisted electron emission allows for compensation in the properties of the hot and cold cathodes. The benefit of the example embodiments will be clear, when the comparisons are made between the Schottky emission, the thermionic emission, and the field emission. It is well known that a cold cathode can be poisoned by the adsorption of electronegative elements such as S, Cl existing as residual gaseous species in the tube. If the adsorption is severe, the cathode will cease to emit electrons. For a field emission X-ray tube, the cold cathode can be regenerated by removing the tube from the housing and baking out the entire tube in an oven, and then mount the tube back to see the effect of baking out—a cumbersome process. On the other hand, for a Schottky emission tube, the heating resulting in a moderate temperature rise at the cathode assists the emission of the electrons while at the same time preventing the adsorption of the poisoning gas atoms or molecules on the cathode. In case the poisoning occurs, the regeneration can be done by heating the cathode directly without removing the tube from the tube housing. The lower power consumption will result in a more compact power source to be utilized, thereby allowing for the x-ray device to become more portable. Furthermore, the use of such electron emission mode eliminates the need for a cooling system or long cool down and warm up periods that are common for hot filament-based systems.

The example embodiments are directed towards an electron emitter for an x-ray tube. The electron emitter comprises an electrically conductive substrate and a nanostructure material. The nanostructure material is comprised on at least a portion of the electrically conductive substrate. The nanostructure material is made of oxides, nitrides, silicides, selenides or tellurides.

An example advantage of the above embodiment is that the use of such a nanostructure material allows for a thermally assisted emission, such as a Schottky emission. Thus, a more compact x-ray device may be obtained compared with Thermionic emission.

According to some of the example embodiments, the electrically conductive substrate is made of stainless steel, nickel, nickel based alloys, iron or iron based alloys.

According to some of the example embodiments, the electrically conductive substrate is in the shape of a solid cylinder with a circular, polygonal, or star cross-section.

An example advantage of the above embodiment is the ability to control the direction, density, as well as other characteristics, of the electron emission by varying the shape of the electron emitter.

According to some of the example embodiments, the nanostructure material is doped or co-doped with a dopant element from column IA, IIA, IB, IIIA, VIA, or VIIA in the periodic table of the elements.

According to some of the example embodiments, the nanostructure material is made of ZnO. It should be appreciated that the nanostructure material may be made of iron oxides, gallium nitride or any other related alloys or compounds thereof.

An example advantage of such embodiments is the ability of providing an alternative to the CNT based electron emitters. The use of such an alternative provides an example benefit of providing an electron emitter that is more compatible with Schottky based emission. Carbon based electron emitters are prone to damage at the temperatures and reactive gaseous environment of typical tube manufacturing processes, whereas ZnO and related materials are high in melting temperature and chemically more stable with equally attractive field emission performance to CNTs.

According to some of the example embodiments, the portions of the electrically conductive substrate that do not comprise the nanostructure material further comprising a dielectric layer. According to some of the example embodiments, the dielectric layer is SiO2.

An example advantage of such embodiments is the ability to control the electron emission. The controlling may be in the form of controlling a direction or density of the electron emission.

According to some of the example embodiments, the electrically conductive substrate is attached to a heating element. An example advantage of such an embodiment is the ability of providing different electron emission modes, for example, Schottky emission.

According to some of the example embodiments, the electron emitter is configured for Schottky emission when the heating element is in an on-state and the electron emitter is negatively biased. According to some of the example embodiments, the electron emitter is configured for field emission when the heating element is in an off-state and the electron emitter is negatively biased.

An example advantage of such embodiments is that the electron emitter may be configured for dual operational modes allowing for both field emission and Schottky based emission. Furthermore, a hot filament can also be placed. Such an embodiment has the example advantage of providing a versatile device utilizing all three electron emission modes whenever needed, which may generate x-ray images at various resolutions and contrast levels.

Some of the embodiments are directed towards an x-ray device comprising the electron emitter described above. An example advantage of having such an x-ray device is the ability of having a versatile device that may operate in a Schottky emission mode. Thus, the device may be portable as described above.

According to some of the example embodiments, the x-ray device further comprises a plurality of electron emitters arranged to emit electrons towards an electron-receiving component. According to some of the example embodiments, the plurality of electron emitters are individually activated, simultaneously or sequentially.

Such embodiments have the example advantage of providing a more versatile device as activating the different electron emitters may provide a difference in the resulting electron emission. Thus, differences in image resolution, etc. may be obtained.

The electron emitters disclosed above with the anode constitutes a so-called diode X-ray tube. In what follows, the electron source can be configured to consist of the cathode as disclosed above and a grid electrode. And an X-ray source consisting of this type of electron source and an anode is referred to as a triode tube.

The example embodiments are directed towards an electron source for X-ray tubes. The electron source comprises a cathode as disclosed above and a grid, which are placed at a fixed interval of distances and fixed by a ceramic spacer. The grid is made of electrically conductive wires of equal diameter. Furthermore, the wires are made of high melting point, low vapor pressure and electrically conductive materials, such as W, Mo, Ta, Ni, stainless steel, or nickel based alloys. The diameter of the wires varies between 30 μm and 150 μm. The opening ratio of the grid varies between 50% and 80%. Furthermore, the surface of the wires in the grid is coated with a thin layer or multilayers of material(s) with properties of pronounced secondary electron emission. Alternatively, the coating is a UV emitting material. Thus, the coating increases the output intensity of the electrons from the source. It is evident, nevertheless better to point out that placing a grid in front of the cathode is a common practice in vacuum tubes and even field emission devices, the present embodiment exhibits clear distinction to prior art in the following aspects: the cathode material, emission mechanism, and an enhancement effect. Thus the overall advantages of a this kind of electron source as manifested in a triode X-ray tube are the independency of the electron beam on the anode, and the enhanced current output.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
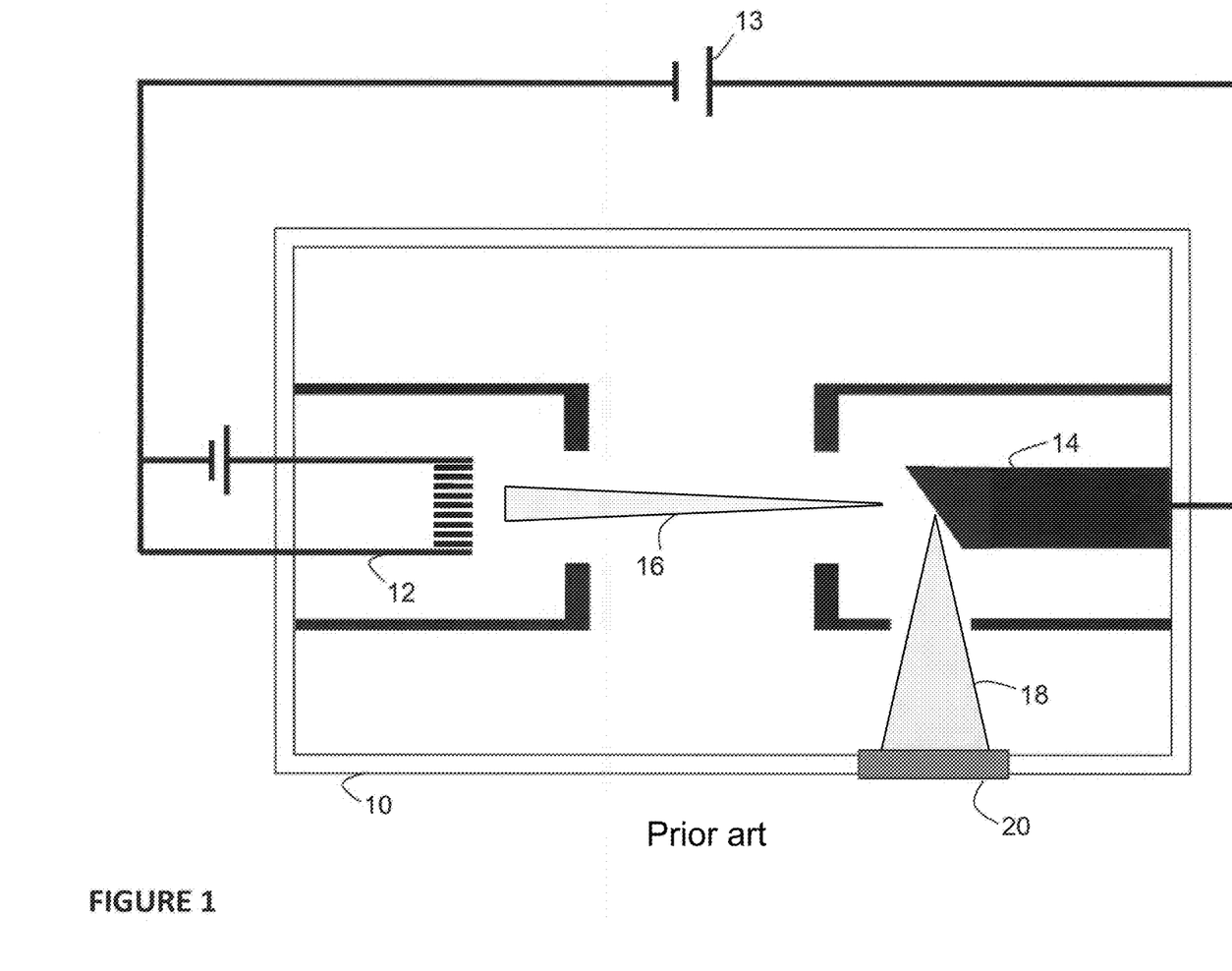
FIG. 1 is a schematic of an x-ray device based on thermionic emission.

Example embodiments presented herein are directed towards an electron emitter for an x-ray device, where the electron emitter comprising a nanostructure material made of oxides, nitrides, silicides, selenides or tellurides. Such an electron emitter is useful for enabling an x-ray device with a Schottky emission operating mode. In order to better describe the example embodiments, a problem will first be identified and discussed. FIG. 1 illustrates a traditional x-ray tube. The x-ray tube of FIG. 1 features an evacuated glass tube 10 comprising a hot filament cathode 12 and an anode 14 made of refractory metal/alloy. The surface of the anode 14 faces the cathode 12 at a predetermined inclination angle. An electric current, provided by a power supply 13, passes through the filament cathode 12 causing an increase in the temperature of the filament 12 to a level that emits an electron beam 16 from this filament. The electron beam 16 is then accelerated towards the anode 14 in the electric field. This results in an x-ray beam 18 that is directed out of the device via a window 20. The voltage difference between the cathode and the anode determines the energy of the x-ray beam.

Perhaps all x-ray tubes used in X-ray imaging utilizes hot cathodes of tungsten filaments based on thermionic emission. In the past decade or so, attempts were made to use carbon nanotubes (CNTs) as a cold cathode to generate X-rays by means of field emission. Such electron emission is induced by a high electric field without heating. CNTs are thought as an ideal emitter for electrons. However, to use them in x-ray sources, the manufacturing process and work conditions seem to present severe challenges to their material properties. The current output is still well below the level for practical applications. Thus, at least one object of the example embodiments presented herein is to provide an alternative electron emitter, which may provide for alternate means of electron emission to overcome the material and operational disadvantages inherent in the hot cathode as well as in the cold cathode based on CNTs; and consequently brings in portable x-ray sources with improved performance.

Accordingly, the example embodiments presented herein are directed towards an electron emitter for x-ray devices. The electron emitter comprises a nanostructure material made of oxides, nitrides, silicides, selenides or tellurides. Such a nanostructure material makes the electron emitter suitable for field emission and more importantly for Schottky emission. The use of a thermally assisted electron emission allows for compensation in the properties of the hot and cold cathodes. The benefit of the example embodiments will be clear, when the comparisons are made between the Schottky emission, the thermionic emission, and the field emission. It is well known that a cold cathode can be poisoned by the adsorption of electronegative elements such as S, Cl existing as residual gaseous species in the tube. If the adsorption is severe, the cathode will cease to emit electrons. For a field emission X-ray tube, the cold cathode can be regenerated by removing the tube from the housing and baking out the entire tube in an oven, and then mount the tube back to see the effect of baking out—a cumbersome process. On the other hand, for a Schottky emission tube, the heating resulting in a moderate temperature rise at the cathode assists the emission of the electrons while at the same time preventing the adsorption of the poisoning gas atoms or molecules on the cathode. In case the poisoning occur, the regeneration can be done by heating the cathode directly without removing the tube from the tube housing. The lower power consumption will result in a more compact power source to be utilized, thereby allowing for the x-ray device to become more portable. Furthermore, the use of such electron emission mode eliminates the need for a cooling system or long cool down and warm up periods that are common for hot filament-based systems.

Figure 2:
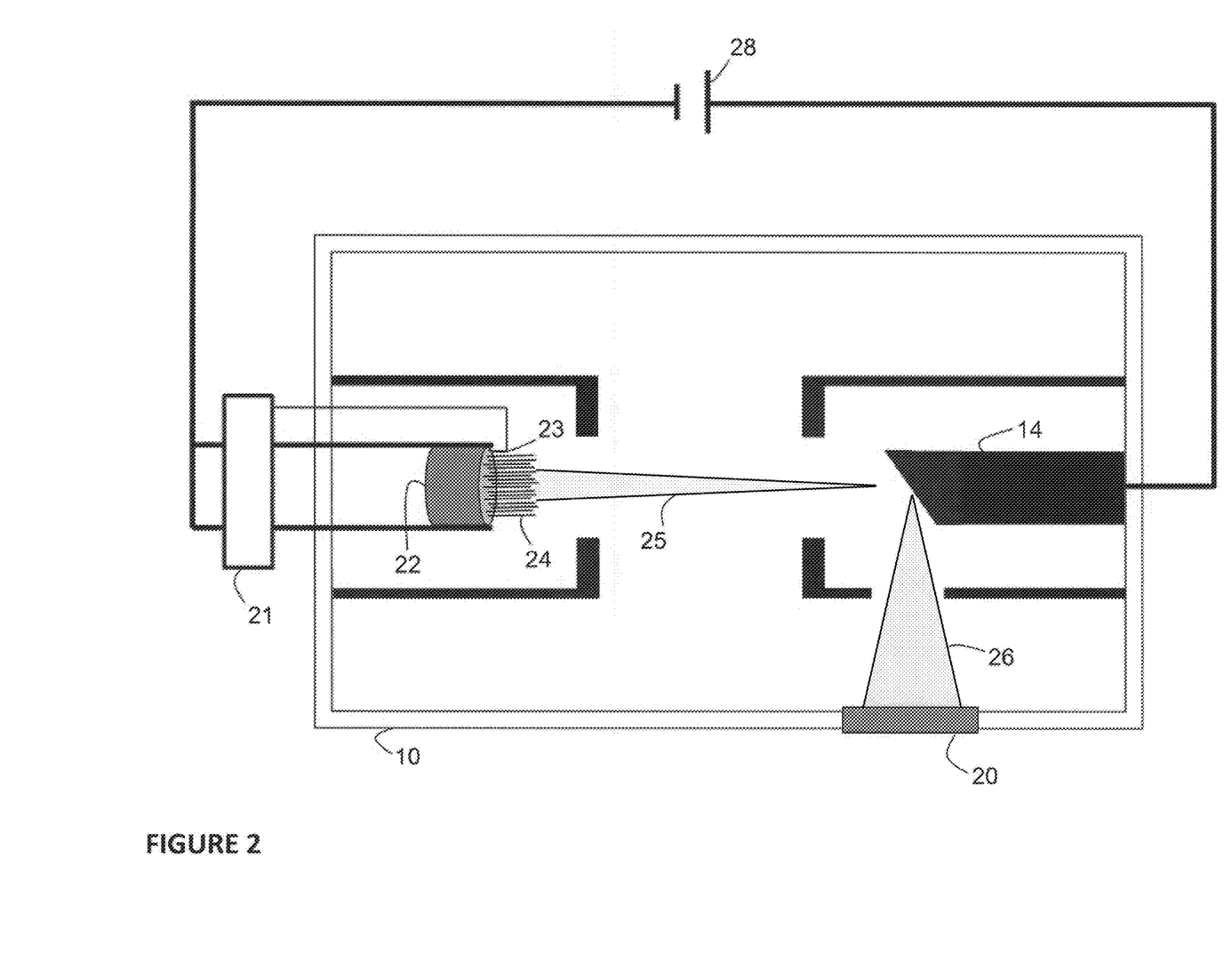
FIG. 2 is a schematic of an x-ray, according to the example embodiments described herein.

FIG. 2 illustrates an x-ray device according to the example embodiments. The x-ray device of FIG. 2 comprises an evacuated glass tube 10 comprising an electron emitter, or cathode, 22 and an electron-receiving component 14. The surface of the electron-receiving component 14 faces the electron emitter 22 at a predetermined inclination angle. The plane of the emitters can also be arranged parallel to the electron-receiving component. An electric current, provided by a power supply 28, passes through a heating element 21 causing an increase in the temperature of the electron emitter 22 to a level that assist the emission of electrons 25 beam from the electron emitter 22, when the cathode at the same time is negatively biased. Such emission is known as Schottky emission. In contrast to the electron emission of FIG. 1, which is induced solely by the high temperatures due to heating, the emission of FIG. 2 is induced by an electric field under assistance of a moderate heating.

The electrons in the electron beam 25 are then accelerated towards the electron-receiving component 14 with an electric field. This results in an x-ray beam 26 that is directed out of the device via a window 20. The voltage difference between the electron emitter and the electron-receiving component determines the energy of the x-ray beam.

Figure 3:
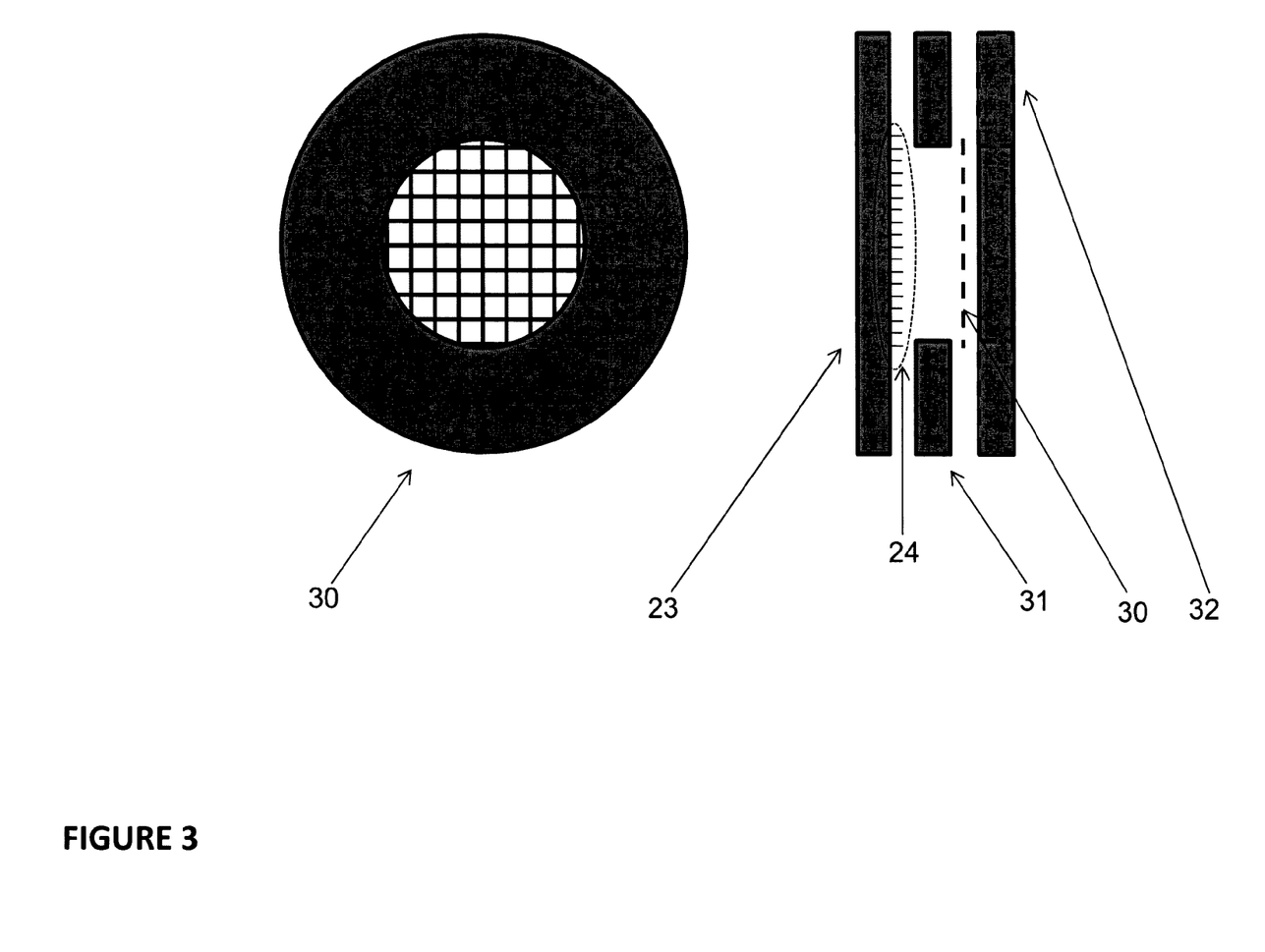
FIG. 3 is an illustrative example of an electron emitter with a grid, according to some of the example embodiments described herein.

According to some of the example embodiments, a grid 30 is placed in between the surface 23 comprising the nanostructures 24 of electron emitter and the electron-receiving component 14 that acts as an extraction electrode, as illustrated in FIG. 3. According to some of the example embodiments, a spacer 31 is placed between the electron emitter and the grid 30. The grid may be placed at an interval distance between 100 μm and 1000 μm that is fixed via the spacer. A circular cover is placed on top of the grid acting as the grid electrode providing a voltage to the grid, 32. According to some of the example embodiments, the spacer may be a ceramic spacer.

The grid is made of electrically conductive wires of equal diameter. Furthermore, the wires are made of high melting point, low vapor pressure and electrically conductive materials, such as W, Mo, Ta, Ni, stainless steel, or nickel based alloys. The diameter of the wires varies between 30 μm and 150 μm. The linear opening ratio of the grid varies between 50% and 80%. Furthermore, the surface of the wires in the grid is coated with a thin layer or multilayers of material(s) with properties of pronounced secondary electron emission, such as MgO and related materials. Alternatively, the coating is a UV emitting material, such as GaN and related materials.

Figure 5:
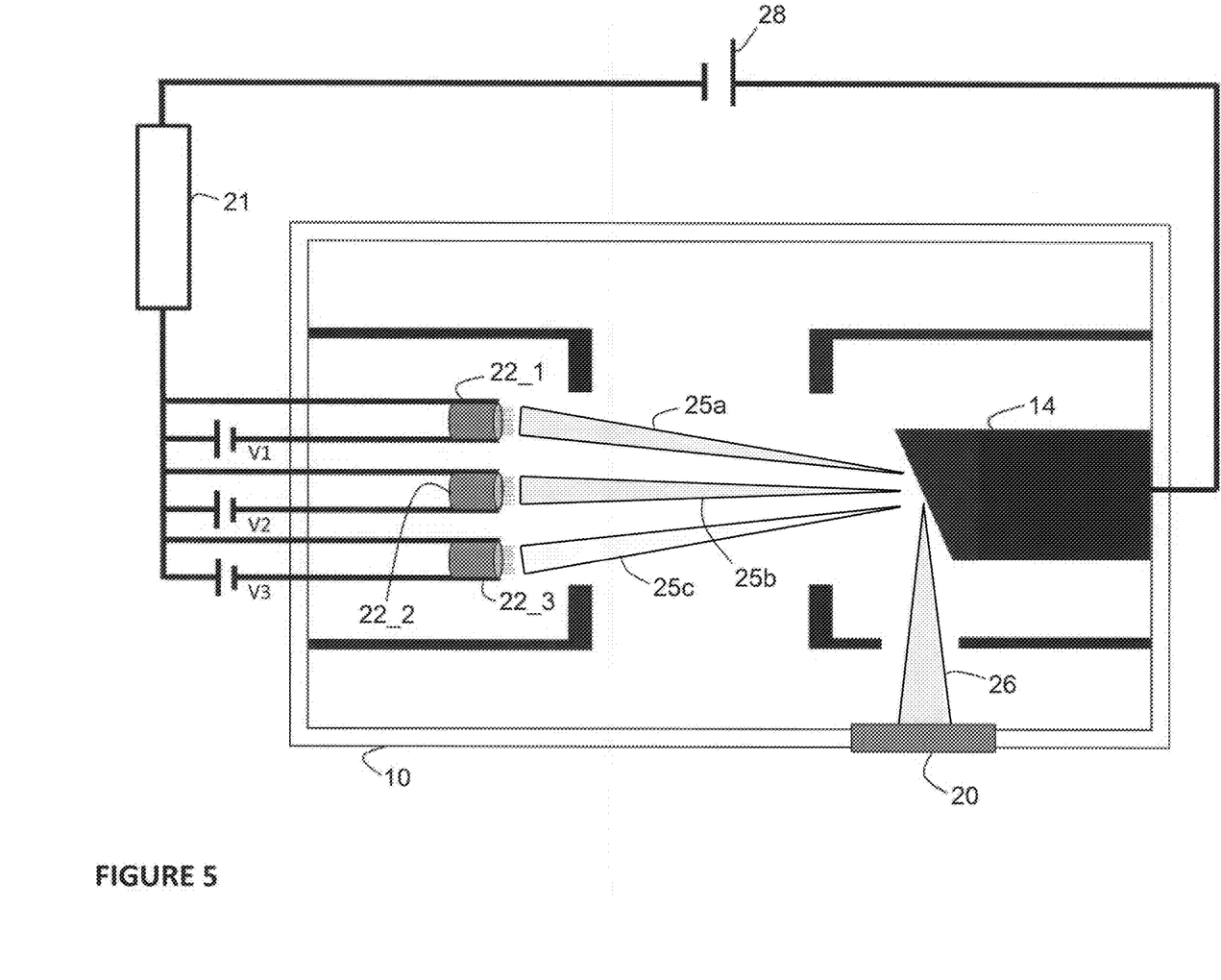
FIG. 5 is a schematic of an x-ray device comprising multiple electron emitters, according to some of the example embodiments described herein.

Thus, the coating increases the output intensity of the electrons from the electron emitter. Thus, the overall advantages of a this kind of electron emitter as manifested in a triode X-ray tube, as illustrated in FIG. 5, are the independency of the electron beam on the anode, and the enhanced current output. Furthermore, the field established between the electron emitter and the grid determines the intensity of the electron beam. Again, the voltage difference between the electron emitter and the electron-receiving component 14 determines the energy of the x-ray beam. It should be appreciated that the grid and spacer of FIG. 3 may be applied to an electron emitter according to any of the example embodiments provided herein.

The electron emitter 22 comprises an electrically conductive substrate 23 comprising of a coating of nanostructures 24. The heating element 21 is attached to the electrically conductive substrate 23 via two electric feed-throughs at the cathode end of the tube. The nanostructure coating 24 may be grown on the electrically conductive substrate 23. The nanostructure coating may be in the form of nanoparticles, nanowires, nanorods, nano tetrapods or nanotubes. The materials of the substrate can be stainless steel, nickel, nickel-based alloys, iron or iron-based alloys. According to some of the example embodiments, the substrate is pre-formed into various shapes.

Figure 4:
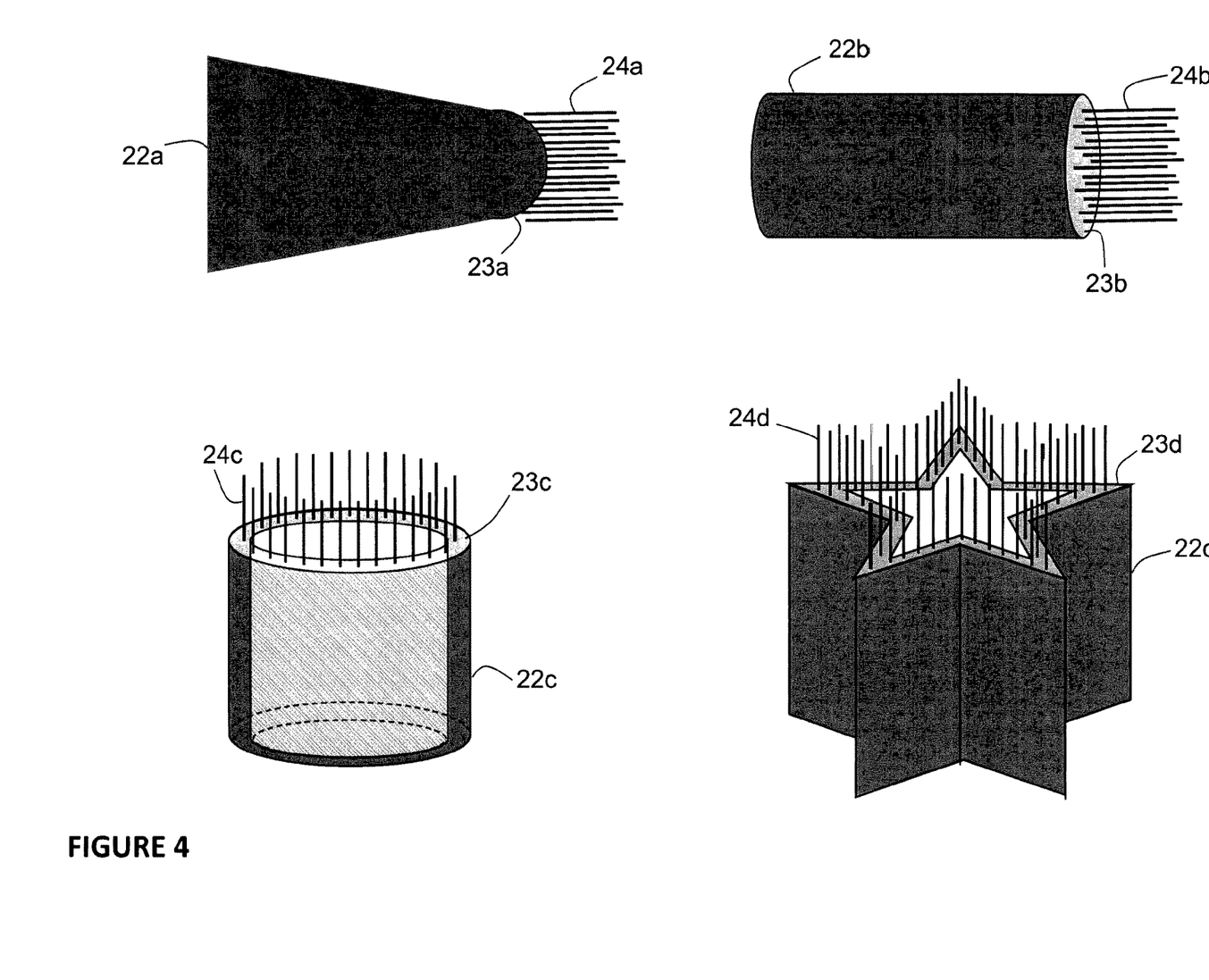
FIG. 4 is an illustrative example of different shapes an electron emitter may have, according to some of the example embodiments described herein.

FIG. 4 illustrates example shapes in which the electron emitter may be shaped. The electron emitter 22a is in the shape of a rounded pyramid comprising an electrically conductive substrate 23a and a coating of nanostructures 24a. A further example of an electron emitter 22b is provided in the form of a solid cylinder also comprising an electrically conductive substrate 23b and a coating of nanostructures 24b. FIG. 4 provides a further example of an electron emitter in the form of a hollow cylinder 22c featuring an electrically conductive substrate 23c and a coating of nanostructures 24c. An additional example of an electron emitter is provided in the form of a hollow star 22d comprising an electrically conductive substrate 23d and a coating of nanostructures 24d. It should be appreciated that such shapes may be adapted for different uses of the x-ray as the shapes may affect the direction of the emitted electrons. It should further be appreciated that other shapes may also be employed in the x-ray device according to the example embodiments.

The substrates described in FIG. 4 may be bundled in parallel at a given space. The surface formed by the top ends of the substrates may be planar, concave or convex in shape to shape the focal spot of the electron beam.

According to some of the example embodiments, the nanostructure coating may be grown by a solid-liquid-gas phase method, chemical vapour deposition (CVD) process, or a chemical solution method. According to some of the example embodiments, the nanostructure coating is configured to be altered, with respect to morphology, to further facilitate the electron emission by chemical, electrochemical or optical means in or after the growth process.

According to some of the example embodiments, the nanostructure coating may be made of oxides, nitrides, silicides, selenides or tellurides. According to some of the example embodiments, the nanostructure coating may be made of oxide semiconductors, for example, ZnO. ZnO is an n-type, wide band gap semiconductor. The conductivity is associated with the oxygen vacancy generated in the growth process.

Improvement of the conductivity is achieved by doping the chemical elements in the columns IA, IIA, IB, IIIA, VIA, VIIA in the periodic table of the elements. Post-growth heat treatment is applied to homogenize the dopants or to partially segregate them to the surface. The morphology of the nanostructure can be altered by chemical or electrochemical means to achieve local field enhancement. UV treatment may also be applied to improve the surface properties. A surface coating may be applied to the nanostructures to further enhance the electron emission process through decreasing the work function at the surface of the emitter.

According to some of the example embodiments, a dielectric layer, for example, $SiO_2$, may be added on the electrically conductive substrate in areas in which the coating of the nanostructures is not present. Such a dielectric coating may be useful in directing the electron emission.

When a moderate heating is applied, via the heating element 21, while the electron emitter is negatively biased, the electrons are emitted by Schottky emission. When the heating is turned off, while the cathode is negatively biased, the electrons are emitted by field emission. The added function of heating, which is absent in pre art field emission x-ray sources, may also be applied to regenerate the electron emitter by removing unwanted adsorbed chemical species from the surface of the emitters in the case of cathode poisoning.

According to some of the example embodiments, multiple electron emitters may be used in the x-ray device. FIG. 5 illustrates an x-ray tube in which multiple electron emitters, in this embodiment, three electron emitters 22_1, 22_2 and 22_3 are assembled in the enclosed tube 10 with the emitters facing the electron-receiving component 14. The number and spacing of the electron emitters may vary.

It should be appreciated that any number of electron emitters may be employed in the x-ray device according to the example embodiments. It should further be appreciated that the electron emitters of FIG. 5 may be the electron emitter featured in any of FIGS. 2 through 4, or an emitter of any other shape. It should also be appreciated that the electron emitters need not be identical and may comprise different shapes and/or characteristics with respect to one another.

The pattern of the arrangement of the electron emitters may be, but is not limited to, linear, circular, rectangle, square, or other polygonal shape. With respect to the relation to the electron receiving component 14, the electron emitters 22_1, 22_2 and 22_3 may be arranged so all of them emit electrons 25a-25c directed to one focal spot on the electron receiving component 14, or so that they project a magnified or demagnified image of the emission pattern onto the electron receiving component 14.

All these variations are intended to meet the requirement for the dimension and the shape of the x-ray beam 26. The electron emitters 22_1, 22_2 and 22_3 may be activated collectively or individually, simultaneously or sequentially. Such a flexible activation regime allows a high frequency, pulsing mode for x-ray generation by setting the output frequency of the power source and a wide range of dose selection by choosing the number of activated electron emitters 22_1, 22_2 and 22_3. The activation of the electron emitters 22_1, 22_2 and 223 may be controlled by the power supply 28.

The example embodiments presented herein allow for the individual activation of the electron emitters 22_1, 22_2 and 22_3, thereby providing a mechanism for stabilizing emission current, which is not available in current x-ray systems. It should be appreciated that the inhomogeneity in the emission is a serious problem in large area cathodes or multi cathodes. This problem stems from the geometrical and physical inhomogeneity of the emitters.

In other words, the problem of the emitters described above stems from material and processing issues. Therefore, some of the example embodiments are directed towards an improvement on the growth of the emitter material on the substrate.

According to some of the example embodiments, the existence of the inhomogeneity among the emitters is also solved at the component level. Such an example embodiment is described by taking a three-cathode configuration as example of FIG. 5.

Figure 6A:
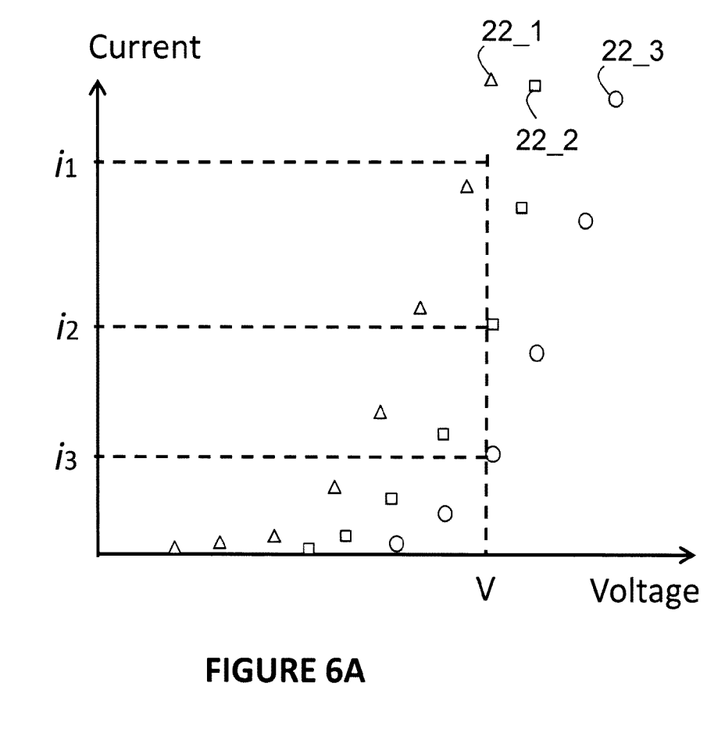
FIGS. 6A and 6B are graphs illustrating the I-V characteristics of the electron emitters of FIG. 5, according to some of the example embodiments described herein.
Figure 6B:
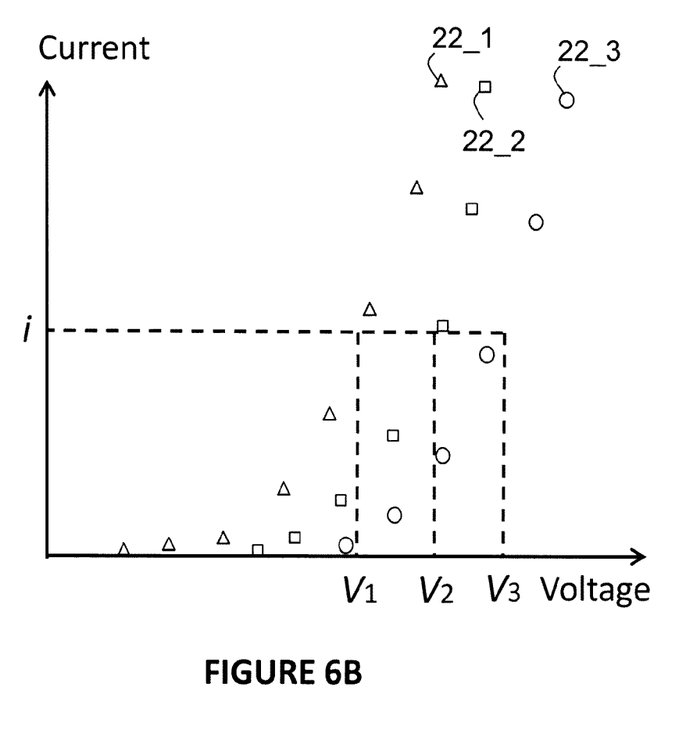

FIGS. 6A and 6B illustrates the current and voltage characteristics of the electron emitter configuration of FIG. 4. In each graph, the plotted points represented by the triangular, square and circular symbols represent the voltages and currents from the electron emitters 22_1, 22_2 and 22_3, respectively, of FIG. 5.

FIG. 6A illustrates an application of voltage V, while keeping a same distance between the same electron emitter and electron-receiving component. Each electron emitter 22_1, 22_2 and 22_3, will emit current i1, i2 and i3, respectively. As shown in the graph of FIG. 6A, the amount of current supplied by the electron emission of each electron emitter differs. Although the inhomogeneity may be quantitatively described by formally defining the mean square error or root mean square deviation of the measured current values of all emitters in question, the graphical difference shown in FIG. 6A is sufficient to illustrate the point.

If all of the three electron emitters should emit the same current, then different voltages v1, v2, and v3 need to be applied to the electron emitters 22_1, 22_2 and 22_3, respectively, as seen in FIG. 6B. The advantageous consequence manifests itself when the electron emitters are directed to different focal spots to create a particular shape of the x-ray beam. The mechanism provides a spatial homogeneity of the x-ray beam by providing a constant current at all focal spots. A further advantage is that when the electron emitters are directed towards one focal spot, and biased sequentially, the emitters provide an electron emission with temporal homogeneity with a constant current overtime. In addition, to ensure the stability and homogeneity of the x-ray emission, a feedback monitoring circuit may be used to control the electron emission process.

According to some of the example embodiments, the electrical power source 28 is further configured to supply a potential difference between the at least one electron generating component(s) and the electron receiving component for a diode tube in three bias modes, (−,0: cathode negative, anode grounded), (−,+: cathode negative, anode positive) and (0,+: cathode grounded, anode positive). The use of such bias modes is provided for inducing the Schottky emission or field emission. Thus, an example advantage of such an embodiment with lower heating power requirement is the elimination of a cooling system or long cool down and warm up periods that are common for hot filament-based systems. Thus, a more portable x-ray device may be obtained.

According to some of the example embodiments, the electrical power source is configured to operate in DC mode, i.e. constant (−, 0), (−, +), (0, +); pulse mode, i.e. square waves with the anode grounded or with the cathode grounded; or AC mode, i.e. a sinus wave. An example advantage of providing an electrical power source with different modes of operations is the ability of providing a more versatile device. For example, in pulse and AC modes, a defined rising time, frequency, duty cycle and pulse shape of waveform may be obtained.

It should be appreciated that the x-ray device described herein may be used in a number of fields. For example, the x-ray device may be used in a security scanning apparatus, for example, as one would find in an airport security check. As the use of the heat element and the Schottky emission allows for a more portable device, the x-ray device may be easily implemented in such a security system.

A further example use of the x-ray device discussed herein is in medical scanning devices such as a computed tomography (CT) scanning apparatus or a C-arm type scanning apparatus, which may include a mini C-arm apparatus. A further example use of the x-ray device described herein is in a geological surveying apparatus.

It should be appreciated that the x-ray device described herein may be used in any non-destructive testing apparatus.

A few example application of the x-ray device may be mammography, veterinary imaging, and X-ray fluorescence spectrometry, etc.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. An electron emitter for an x-ray tube, the electron emitter comprising:
    an electrically conductive substrate; and
    a nanostructure material is comprised on at least a portion of the electrically conductive substrate, wherein the nanostructure material is made of ZnO,
    wherein the nanostructure material is grown on the electrically conductive substrate,
    wherein the electrically conductive substrate is attachable to a heating element via two electric feed-through at the cathode end of the tube;
    wherein the heating element is arranged to cause an increase in the temperature of the electron emitter to a level that assists the emission of electrons from the emitter when the cathode is negatively biased,
    wherein the electron emitter is configured for Schottky emission when the heating element is in an on-state and the electron emitter is negatively biased, and
    wherein the electron emitter is configured for field emission when the heating element is in an off-state and the electron emitter is negatively biased.

2. The electron emitter of claim 1, further comprising a grid situated at a fixed distance from the electrically conductive substrate via a spacer, said distance being between 100 μm and 1000 μm.

3. The electron emitter of claim 1, wherein the electrically conductive substrate is made of stainless steel, nickel, nickel based alloys, iron or iron based alloys.

4. The electron emitter of claim 3, wherein the electrically conductive substrate is in the shape of a solid cylinder with a circular, polygonal, or star cross-section.

5. The electron emitter of claim 1, wherein the nanostructure material is doped or co-doped with a dopant element comprised in column IA, IIA, IB, IA, VIA, or VIIA in periodic table of the elements.

6. The electron emitter of claim 1, wherein portions of the electrically conductive substrate that do not comprise the nanostructure material further comprise a dielectric layer.

7. The electron emitter of claim 6, wherein the dielectric layer is SiO2.

8. An x-ray device comprising the electron emitter of claim 1.

9. The x-ray device of claim 8, further comprising a plurality of electron emitters arranged to emit electrons towards an electron-receiving component.

10. The x-ray device of claim 9, wherein the plurality of electron emitters are individually activated, simultaneously or sequentially.

* * * * *